C. A. BICKETT.
STOCK FOR PAPER CONTAINERS AND PROCESS OF PRODUCING SAME.
APPLICATION FILED JUNE 14, 1913.
1,203,302.
Patented Oct. 31, 1916.
2 SHEETS—SHEET 1.
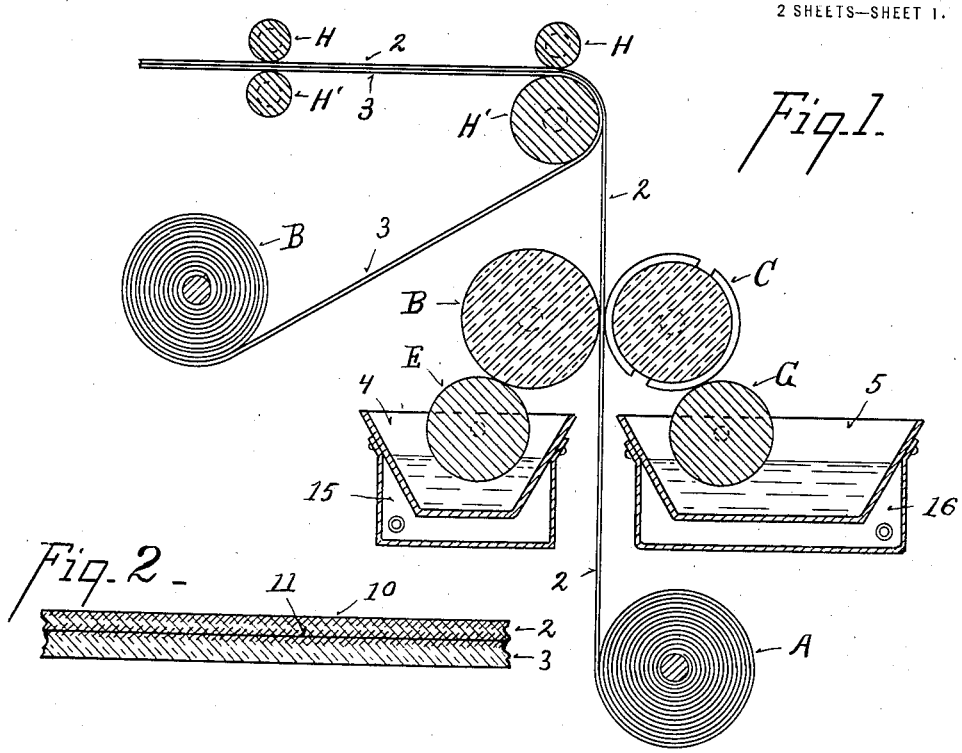
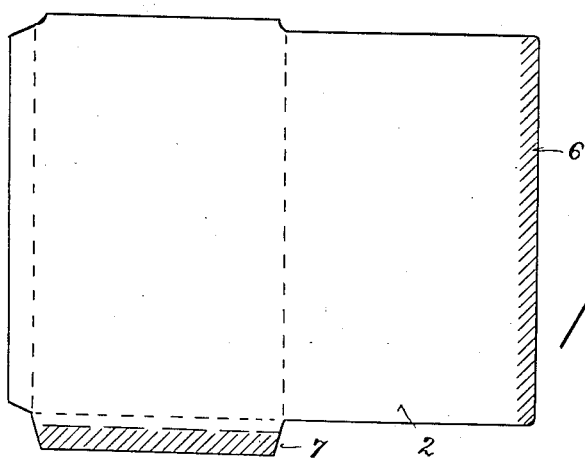
Witnesses
Inventor
Charles A. Bickett
C. W. Miles
By
Attorney C. A. BICKETT.
STOCK FOR PAPER CONTAINERS AND PROCESS OF PRODUCING SAME.
APPLICATION FILED JUNE 14, 1913.
1,203,302.
Patented Oct. 31, 1916.
2 SHEETS—SHEET 2.
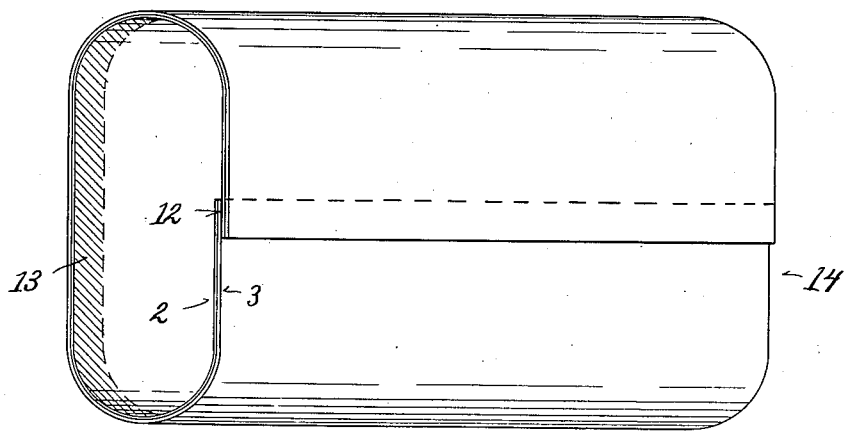
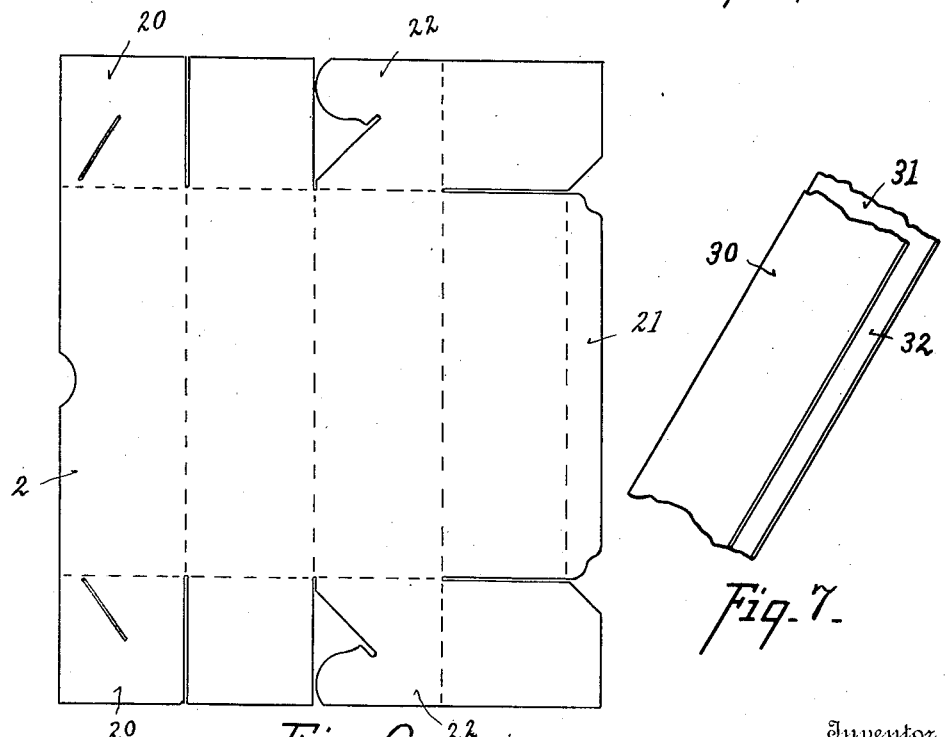

UNITED STATES PATENT OFFICE.

CHARLES A. BICKETT, OF CINCINNATI, OHIO.

STOCK FOR PAPER CONTAINERS AND PROCESS OF PRODUCING SAME.

1,203,302.  Specification of Letters Patent.  Patented Oct. 31, 1916.

Application filed June 14, 1913. Serial No. 773,748.

*To all whom it may concern:*

Be it known that I, CHARLES A. BICKETT, a citizen of the United States, residing at Cincinnati, in the county of Hamilton and State of Ohio, have invented certain new and useful Improvements in Stock for Paper Containers and Processes of Producing Same, of which the following is a specification.
My invention relates to improved stock for the manufacture of paper containers such as boxes, sacks and pouches and method of producing the same.

One of its objects is to provide a stock or material which is water or moisture proof on one side and which possesses strength, and is adapted to receive printing upon the opposite side.

Another object is to provide an improved method of producing a stock from two sheets of material so that all or any desired portion of one surface may be coated with a moisture proof material while the other face will be free from injury to its appearance or printing properties due to the use of moisture proofing materials.

Another object is to prevent the moisture proofing material sinking deeply into the texture of the stock, thereby securing a thin but dense and impervious coating of moisture proofing material.

Another object is to provide for applying the moisture proofing material to certain portions only of one face of the stock, leaving other portions of the same face free to receive adhesive material or to be acted upon by adhesive material in setting up the containers.

My invention further comprises certain details of form, combination and arrangement, and order of procedure, all of which will be fully set forth in the description of the accompanying drawings, in which:

Figure 1 is a diagram illustrating mechanism and method of coating and uniting two sheets of material to produce my improved article or material. Fig. 2 is an enlarged sectional detail through my improved stock. Fig. 3 is an inside plan view of a blank for a container and illustrating one of the applications of my invention. Fig. 4 is an edge or side elevation of the same. Fig. 5 is a perspective view of a tube section to be employed in producing a paper sack, and illustrating another application of my invention. Fig. 6 is a plan view of a paper box blank. Fig. 7 is a view similar to Fig. 2, of a modification.

In the production of paper containers such as sacks, pouches and boxes, it is desirable for many classes of goods, to provide containers having moisture proof faces, which should also be combined with strength of material, a neat appearance and generally with an external face adapted to receive printing. It is also important under certain circumstances to provide material in which a portion or portions only of one face of the stock or material is coated with moisture proof material leaving other portions to be coated with or free to be acted upon by adhesive material employed in setting up or completing the containers.

The moisture proofing material most suitable for, and most extensively used, is paraffin, and where moisture proofing material, as heretofore employed, is applied to a sheet of paper it sinks, probably by capillary attraction, deep into the fiber of the paper and is liable to produce an imperfect moisture proof coating and to extend through to the opposite face of the sheet so as to injure the appearance of the opposite face of the sheet, and to prevent the subsequent application of printing thereto.

In producing my improved article, and carrying out my invention, which is illustrated in its preferred embodiment in the accompanying drawings, I preferably provide for the continuous feeding of two sheets 2 and 3 of material or paper, from rolls A and B. The sheet 3 is preferably of strong tough material to give strength to the container. This sheet is preferably employed to constitute the outer face of the stock or container and is generally intended to receive printing. The sheet 2 is preferably of thinner material and of less strength, and is designed generally to form the inner face of the stock or container and to receive the moisture proof coating upon its inner face and to receive a coating of adhesive material upon its opposite face to cause the sheets 2 and 3 to firmly unite.

By applying the moisture proofing material to one side of sheet 2 and the adhesive material to the opposite side of sheet 2 at substantially the same time each tends to sink into the fiber of the sheet from opposite sides, and said moisture proofing material and adhesive material not being miscible with each other, each penetrates to about the center of the thickness of the sheet and each prevents the other from penetrating to the opposite side of the sheet. This action of the adhesive material upon the moisture proofing material causes a dense concentrated layer or coating of moisture proofing material to be deposited at or close to one face of sheet 2 instead of being more widely and less densely deposited through the entire substance of sheet 2. Where paraffin is employed as the moisture proofing material, the paraffin being normally a substantially solid substance, requires to be heated to render it sufficiently fluid to be properly applied as a coating to the sheet, and the adhesive material which may be a water solution of glue, dextrin, gum-arabic or like adhesive material, is preferably heated to substantially the same temperature as the paraffin in order that each may penetrate the sheet to the desired depth, and that the paraffin may not be chilled by the application of the adhesive material.

In practice the sheet 2 is unwound from the roll A and passes between the rollers B and C. The roller B receives a surface coating of adhesive material by contact with roll E which dips into the adhesive material in a vat 4. The roller C, may have a plain cylindrical surface to evenly coat the entire surface of the sheet with moisture proofing material, or a segmental cylindrical surface to coat only parts of the face of sheet 2 with moisture proof material. The roller C receives a supply of moisture proofing material by contact with the surface of roll G which dips into liquid moisture proofing material in the vat 5. The sheets 2 and 3 are then passed between compression rolls H H' where the two sheets are firmly united due to the adhesive material between them. The continuous sheet of stock material leaving the rolls H H' may now be printed and blanked or otherwise treated to work it into containers of various shapes as required, and the containers when completed will have strength and an unblemished external appearance and a moisture proof coated interior.

Where rollers C with segmental faces are employed to coat only a portion of the face of the sheet 2, the pattern of said rollers are such that when the stock is cut into blanks, such as illustrated in Figs. 3 and 4, for instance, there will be portions 6 and 7 of the inner face which are not coated with moisture proofing material, and which are in condition to receive adhesive material to unite the overlapping edges of the containers while all inwardly exposed faces of the finished container are coated with moisture proofing material. As illustrated in Fig. 5 edges 12 and 13 of the inner face of the stock 14 have been left uncoated with moisture proofing material to permit the seams to be adhesively united, and the tubular blank as shown in Fig. 5 is in condition to have one end folded and adhesively secured to form a sack having a moisture proof coating on its inner face.

In Fig. 2 the moisture proof coating is represented by 10 and the adhesive material by 11. If desired the adhesive material may be applied to the inner side of sheet 3 instead of to sheet 2, provided said sheets are quickly pressed together thereafter and before the moisture proof material has penetrated too deeply into sheet 2. In practice a series of rolls H H' are employed instead of a single pair of such rolls. Steam or hot water jackets 15 and 16 enable the vats 4 and 5 to be heated to the desired degree. Canvas may be employed instead of paper for sheet 3 if desired. The use of two or more sheets as heretofore described produces a much stiffer and stronger stock for a given weight of paper, thus effecting a material economy in paper.

Boxes of the general character illustrated in Fig. 6 may be made from stock entirely coated upon one face with moisture proof material, or if desired the sections 20, 21, and 22 may be without moisture proof coating, as when folded these sections do not have their faces exposed as a portion of the interior of the box, and the moisture proof coated sections would present a continuous moisture proof interior surface. Also if desired adhesive material may be applied to all or a portion of the inner face of sections 21 and 22, to be employed in place of the means illustrated to assemble and seal the package.

In the modification Fig. 7 a sheet 30, corresponding to sheet 2 of Figs. 1 and 2, is of less width than the uncoated sheet 31, which corresponds to sheet 3 of Figs. 1 and 2, thus leaving a margin 32 along one edge of sheet 31 exposed inwardly. The two sheets are united by adhesive material as described with reference to sheets 2 and 3. The sheet 30 may be entirely or only partially coated with moisture proof material, depending upon the style of containers to be produced. The margin 32 is without moisture proof coating, and is free to receive or be acted upon by adhesive material.

My improved article and method as herein illustrated and described is capable of considerable modification without departing from the principle of my invention.

Having described my invention, what I claim is:

1. A moisture proof stock for paper containers comprising two sheets of paper united together by an adhesive material immiscible with the moisture proof material employed, the exposed face of one of said sheets being coated with moisture proof material, which is confined to a fraction of the thickness of said sheet by the immiscibility of the adhesive material employed to unite the sheets.

2. A moisture proof stock for paper containers comprising two sheets of paper united by an adhesive material, the exposed face of one of said sheets being coated with a moisture proof material which is confined to a part of the thickness of said sheet due to the immiscibility of said moisture proof material with said adhesive material.

3. A moisture proof stock for paper containers comprising two sheets of paper united by an adhesive material and coated upon the exposed face of one of said sheets with moisture proof material, said adhesive material forming a barrier in the body of said moisture proof coated sheet immiscible with said moisture proof material to confine said moisture proof material to a fraction of the thickness of said sheet.

4. A moisture proof stock for paper containers comprising two sheets of paper united by an adhesive material, a portion of the exposed face of one of said sheets being coated with a moisture proof material and the remainder of the exposed face of said sheet being free to be acted upon by an adhesive material, said moisture proof material being confined to a portion of the thickness of said sheet due to the immiscibility of said moisture proof material with the adhesive material employed to unite the sheets.

5. A stock for paper containers comprising a sheet one face of which has certain portions coated with moisture proof material and other portions free to be acted upon by adhesive material, and a sheet free from moisture proof material, said sheets being united by an adhesive material immiscible with the moisture proof material employed, thereby forming a barrier to prevent the moisture proof material penetrating more than a fraction of the thickness of one of said sheets.

6. A moisture proof stock for paper containers comprising two sheets of paper united by an adhesive material, the exposed face of one of said sheets being coated with paraffin which is confined to a part of the thickness of said sheet due to the immiscibility of the paraffin with said adhesive material.

7. The method of preparing stock for paper containers, which comprises employing two sheets, applying a moisture proof material in fluid condition to the outer face of one of said sheets, and before said moisture proof material has penetrated too deeply into the sheet uniting said sheets by means of an adhesive material which also acts as an immiscible barrier to limit the penetration of said moisture proof material to a part of the thickness of said sheet.

8. The method of preparing moisture proof stock for paper containers which comprises employing two sheets, applying fluid moisture proof material to the outer face of one sheet and adhesive material immiscible with said moisture proof material between the sheets at substantially the same time.

9. The method of preparing moisture proof stock for paper containers which comprises employing two sheets, applying fluid moisture proof material to the outer face of one sheet and adhesive material immiscible with said moisture proof material between the sheets at substantially the same time and at substantially the same temperature.

10. The method of preparing moisture proof stock for paper containers which comprises employing two sheets, applying adhesive material between said sheets and moisture proof material immiscible with said adhesive material to a portion of the exposed face of one of said sheets before the adhesive material has penetrated more than a fraction of the thickness of the sheet, whereby said adhesive material serves as a barrier to limit said moisture proof material to a fraction of the thickness of said sheet and leaves a portion of the exposed face of said sheet in condition to be acted upon by an adhesive material.

11. The method of preparing stock for paper containers which comprises employing two sheets, applying moisture proof material to certain portions of the outer face of one sheet leaving portions of said face uncoated, and applying an adhesive material immiscible with said moisture proof material between the sheets before said moisture proof material has penetrated more than a fraction of the thickness of the sheet to which it is applied.

12. The method of preparing moisture proof stock for paper containers which comprises employing two sheets of different width, applying an adhesive material between said sheets and a moisture proof material immiscible with said adhesive material to the exposed face of the narrow sheet before the adhesive material has penetrated more than a fraction of the thickness of the sheet, whereby the moisture proof material is confined to a fraction of the thickness of said sheet.

In testimony whereof I have affixed my signature in presence of two witnesses.

CHARLES A. BICKETT.

Witnesses:
C. W. MILES,
W. THORNTON BOGERT.